C. C. CAMPBELL, H. W. KING & A. C. SMITH.
BALING-PRESS.

No. 172,965. Patented Feb. 1, 1876.

WITNESSES:

INVENTOR:
C. C. Campbell
H. W. King
A. C. Smith
BY
ATTORNEYS.

UNITED STATES PATENT OFFICE.

CHRISTOPHER C. CAMPBELL, OF EAST CHATHAM, AND HENRY W. KING AND ALLEN C. SMITH, OF CANAAN, NEW YORK.

IMPROVEMENT IN BALING-PRESSES.

Specification forming part of Letters Patent No. 172,965, dated February 1, 1876; application filed January 12, 1876.

*To all whom it may concern:*

Be it known that we, CHRISTOPHER C. CAMPBELL, of East Chatham, in the county of Columbia and State of New York, and HENRY W. KING and ALLEN C. SMITH, of Canaan, in the county of Columbia and State of New York, have invented a new and Improved Baling-Press; and we do hereby declare that the following is a full, clear, and exact description of the same, reference being had to the accompanying drawing forming a part of this specification, in which—

Figure 1:
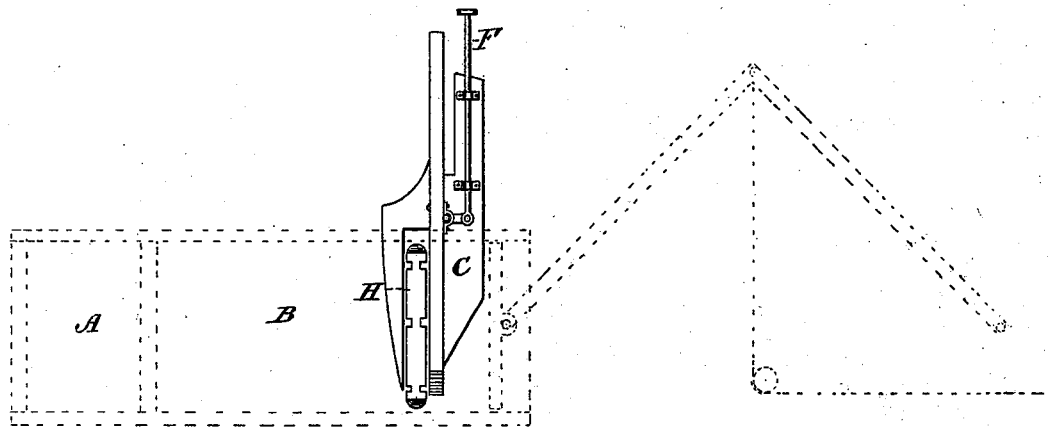
Figure 2:
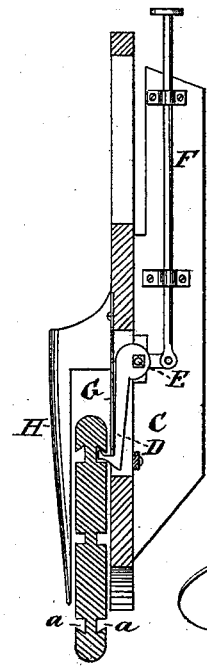

Figure 1 is a side elevation of the device, showing its application to the baling-press indicated in dotted lines; Fig. 2, a vertical section of the device.

This invention relates to certain improvements in perpetual baling-presses, or presses in which the operation of packing the hay in the box and tying it into bales in the baling-chamber is performed at the same time, and both the followers are detachable, each being taken out successively at the end of the baling-chamber, and inserted successively in the packing-box.

The invention consists in the devices for packing the hay or other material in the packing-box, and inserting the follower in the same, as hereinafter more fully described.

In the drawing, A represents the baling-chamber, and B the packing-box, of a horizontal perpetual baling-press, in which a horizontally-sliding plunger drives before it the follower, and effects the compression of the hay or other material. In packing the hay in the packing-box, before pressing the same a vertically-reciprocating tramper, C, is employed, which is designed to pack tightly the loosely-falling hay, and fill the box with a sufficient amount to constitute a proper size bale. Said tramper consists of a frame-work, having its lower ends pronged or pointed, to render the packing uniform, and provided with devices for folding and inserting the followers, of which D are hooks rigidly fastened to a rock-shaft, E, and arranged to be projected through slots in the frame by means of a sliding rod, F, operating upon an arm of the rock-shaft, and held in said slots by means of springs G, so as to be habitually concealed, except when projected through the slots by the action of the sliding rod.

The followers or platens are specially constructed, so as to be adapted to the above-described devices, and for this purpose the end grooves are provided with undercut edges *a*, which receive the hooks when projected, and secure the follower to the hooks. A prong, H, extends down over the follower when thus secured, and protects it against displacement.

The operation of the device is as follows: When the tied bale is to be removed the follower is taken out of the baling-chamber and attached to the tramper by projecting the hooks through by means of the sliding rod, and placing the follower thereupon, the hooks catching in the undercut edges, and holding the same tightly to the tramper. Now, as the follower is to be inserted in the rear of the packing-box, as the tramper descends the follower goes with it; but, projecting lower than the tramper, it first strikes the bottom of the box, and the tramper continuing its downward movement the follower is slipped off the hooks, and, after the tramper rises, is carried laterally into the baling-chamber by the horizontally-moving plunger.

Having thus described our invention, what we claim as new is—

The combination, with the tramper C and the follower, having undercut grooves, of the hooks D, springs G, shaft E, and rod F, substantially as and for the purpose described.

CHRISTOPHER C. CAMPBELL.
  HENRY W. KING.
  ALLEN C. SMITH.

Witnesses:
 THOS. TOMPKINS,
 BYRON E. CADY.